# 2,978,182

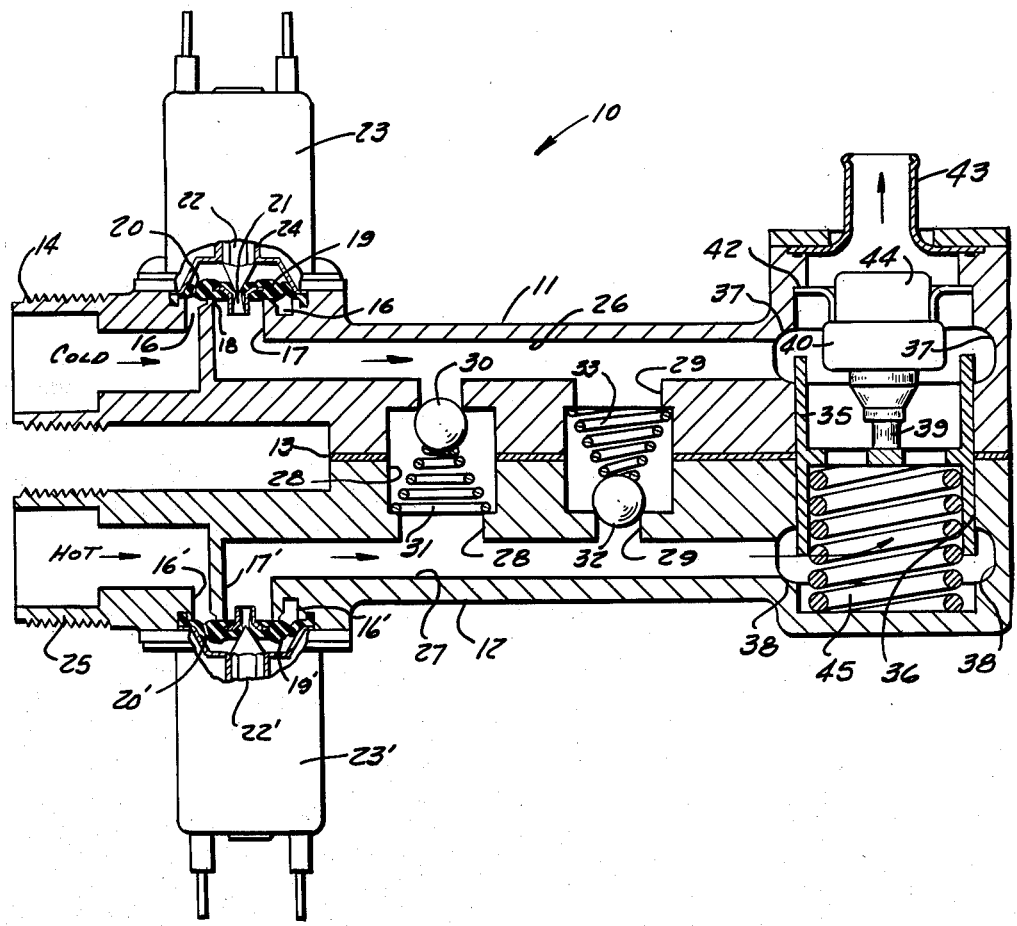
INVENTOR.
*John Sigfrid Amneus*
BY
*Smith, Wilson, Lewis & McRae*

THREE TEMPERATURE MIXING VALVE

John Sigfrid Amneus, Grosse Pointe Woods, Mich., assignor to American Radiator & Standard Sanitary Corporation, New York, N.Y., a corporation of Delaware Filed Oct. 3, 1957, Ser. No. 687,956

8 Claims. (Cl. 236—12)

This invention relates to a valve for mixing hot and cold fluids, as for example in the supply line to the tub of an automatic clothes washing machine.

Objects of the invention are to provide a mixing valve wherein:

(1) the valve is electrically regulated to selectively deliver extremely cold fluid, extremely hot fluid, or an intermediate temperature fluid, (2) the above mentioned outlet fluid temperatures are obtained in a valve employing only two diaphragm-solenoid assemblies, it being appreciated that with many prior art mixing devices extremely high outlet temperatures and extremely low outlet temperatures could only be attained by using three separate diaphragm-solenoid assemblies.

Other objects of this invention will appear in the following description and appended claims, reference being had to the accompanying drawing forming a part of this specification wherein like reference characters designate corresponding parts in the several views.

In the drawing:

The figure is a sectional view through one embodiment of the invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

In the drawing there is shown a mixing valve 10 comprising two housing sections 11 and 12 bolted together by bolt means (not shown) and having a sealing gasket 13 therebetween.

Section 11 provides a threaded cold fluid inlet coupling section 14, which communicates with an annular passage 16 concentrically surrounding a passage section 17. Passages 16 and 17 cooperate with each other to define an annular valve surface 18, across which is positioned a rubber diaphragm 19. This diaphragm is provided with a bleed opening 20 and a central opening 21, which registers with the plunger-armature 22 of a solenoid 23.

The arrangement of parts is such that when solenoid 23 is energized armature 22 is drawn away from opening 21 so as to permit the pressure of fluid in annular passage 16 to force the diaphragm away from valve surface 18, whereby to allow flow of cold fluid into passage 17.

When solenoid 23 is de-energized a spring (not shown) in the outer end of guide sleeve 24 forces plunger 22 to close opening 21. As a result the fluid in annular passage 16 flows through bleed opening 20 so as to develop a fluid pressure on the outer face of the diaphragm and thereby force said diaphragm against valve surface 18. As long as the solenoid is de-energized there is no fluid flow from annular passage 16 into passage 17.

Housing section 12 provides a threaded hot fluid inlet coupling section 25 which communicates with an annular passage 16' concentrically surrounding a passage section 17'. Flow of hot fluid from passage 16' into passage section 17' is controlled by a solenoid-diaphragm assembly having a structure and action similar to that of the previously described solenoid-diaphragm means 23, 19; accordingly similar "primed" reference numerals are employed wherever applicable.

Passage 17 leads into a cold fluid inlet passage 26, and passage 17' leads into a hot fluid inlet passage 27. Flow ducts 28 and 29 interconnect passages 26 and 27 so as to allow fluid flow therebetween when one or the other of solenoids 23 and 23' are de-energized. A spherical check valve element 30 is located in duct 27, and is biased to a position closing the duct by a compression spring 31. Another spherical check valve element 32 is positioned in duct 29, and is biased to a position closing its duct by a compression spring 33.

The operation of valve elements 30 and 32 is such that when diaphragm 19 is closed and diaphragm 19' is open the hot fluid pressure in passage 27 is effective to unseat element 32 so as to permit flow of hot fluid into passage 26. When diaphragm 19 is open and diaphragm 19' is closed the cold fluid in passage 26 unseats element 30 so as to permit cold fluid flow into passage 27.

The above described actions can only take place after the thermostatic operation of a cylindrical slide valve 35 which is mounted for axial movement in a cylindrical mixing chamber 36. Flow of cold fluid into chamber 36 takes place through an annular passage 37, and flow of hot fluid into chamber 36 takes place through an annular passage 38.

Valve 35 engages the piston 39 of a conventional thermostatic power element 40. Element 40 may be of various forms, as for example that shown in Vernet Patent 2,636,776 issued April 28, 1953.

Element 40 is seated on an apertured support structure 42, which is located upstream from an outlet spigot 43. The action of power element 40 is such that when the temperature of fluid surrounding power element cup 44 is relatively high a thermally expansible wax pellet within cup 44 expands so as to force piston 39 downwardly against the action of compression spring 45. As piston 39 moves downwardly it forces valve 35 toward a position closing annular passage 38 and opening annular passage 37, thereby regulating the fluid temperature in spigot 43 at a value intermediate that of the cold and hot fluids supplied through passages 17 and 17'.

With solenoid 23 energized (so as to open passage 17) and solenoid 23' de-energized (so as to close passage 17') the cold fluid pressure will be greater on spherical element 30 than the hot fluid pressure; consequently the cold fluid from passage 17 will flow through passage 26 and into mixing chamber 36 via annular passage 37. This action will cause the power element pellet to contract so as to allow spring 45 to force valve element 35 to a position closing passage 37. Thereupon the fluid pressure in passage 26 will build up sufficiently to unseat valve element 30 in a manner permitting the cold fluid to flow through duct 28, into passages 27 and 38, and through chamber 36 to the spigot. It will thus be seen that when solenoid 23 is energized and solenoid 23' is de-energized the fluid through spigot 43 will be at the temperature of the entering cold fluid.

Similarly, when solenoid 23 is de-energized and solenoid 23' is energized the fluid through spigot 43 will be at the temperature of the entering hot fluid. In this situation the hot fluid through passage 38 warms the power element pellet so as to cause movement of valve element 35 to a position closing passage 38. As a result the pressure in passage 27 builds up so as to unseat spherical element 32 and thereby allow hot fluid to flow through duct 29 into passages 26 and 37, and eventually out through spigot 43.

The ability of the valve to deliver extremely hot fluid (corresponding to the temperature of fluid supplied to coupling 25) as well as extremely cold fluid (corresponding to the temperature of fluid supplied to coupling 14) makes the valve adaptable for use in many applications not heretofore possible with conventional two solenoid mixing valves. In the conventional two solenoid mixing valves it is not possible to deliver extremely hot fluid and extremely cold fluid with the same valve structure. Conventionally a three solenoid construction is required to deliver extremely cold fluid and extremely hot fluid. Such three solenoid constructions are more costly than the present construction.

I claim:

1. A mixing valve comprising a housing formed with a mixing chamber; separate hot and cold fluid inlet passages leading to said mixing chamber; valve means in said mixing chamber for alternately opening said chamber to respective ones of the hot and cold fluid passages; thermostatic power means responsive to the fluid temperature in the mixing chamber for operating the valve means to open the cold fluid passage on temperature increase and open the hot fluid passage on temperature decrease; conduit means interconnecting said hot fluid passage with said cold fluid passage upstream from the mixing chamber; pressure responsive valve structure in said conduit means allowing flow from the hot fluid passage to the cold fluid passage when the supply of cold fluid is cut off; and a second pressure responsive valve structure in said conduit means allowing flow from the cold fluid passage to the hot fluid passage when the supply of hot fluid is cut off; a first shut-off structure carried by the housing and independent of the aforementioned valve structures for controlling flow into the hot inlet passage; and a second shut-off structure carried by the housing and independent of the aforementioned valve structures for controlling flow into the cold fluid passage.

2. The combination of claim 1 wherein the conduit means takes the form of two separate flow ducts, each individually extending between the hot fluid passage and cold fluid passage; one of said pressure responsive valve structures being located in one duct, and the other pressure responsive valve structure being located in the other duct.

3. A mixing valve comprising a housing formed with a cylindrical mixing chamber; first and second annular passages concentric with said mixing chamber and located at axially spaced points therealong; a hot fluid inlet passage formed in the housing and communicating with the first annular passage; a cold fluid inlet passage formed in the housing and communicating with the second annular passage; a separate shut-off structure controlling the flow of fluid into each inlet passage; a cylindrical valve member slidably positioned in the mixing chamber and having its opposite ends located adjacent respective ones of the annular passages; thermostatic power means responsive to the fluid temperature in the mixing chamber for operating the cylindrical valve member to open the second annular passage on temperature increase and open the first annular passage on temperature decrease; conduit means interconnecting said hot fluid passage with said cold fluid passage upstream from the mixing chamber; resiliently urged pressure responsive check valve structure in said conduit means allowing flow from the hot fluid passage to the cold fluid passage when the supply of cold fluid is cut off; and a second resiliently urged pressure responsive check valve structure in said conduit means allowing flow from the cold fluid passage to the hot fluid passage when the supply of hot fluid is cut off.

4. A mixing valve comprising a housing formed with a cylindrical mixing chamber; first and second annular passages concentric with said mixing chamber and located at axially spaced points therealong; a hot fluid inlet passage formed in the housing and communicating with the first annular passage; a diaphragm positioned on the housing to halt flow into the hot fluid passage; solenoid means for controlling the position of said diaphragm; a cold fluid inlet passage formed in the housing and communicating with the second annular passage; a diaphragm positioned on the housing to halt flow into the cold fluid passage; solenoid means for controlling the position of the second diaphragm; a cylindrical valve member slidably positioned in the mixing chamber and having its opposite ends located adjacent respective ones of the annular passages; thermostatic power means responsive to the fluid temperature in the mixing chamber for operating the cylindrical valve member to open the second annular passage on temperature increase and open the first annular passage on temperature decrease; two separate conduits interconnecting said hot fluid passage with said cold fluid passage upstream from the mixing chamber; pressure responsive check valve structure in one of said conduits allowing flow from the hot fluid passage to the cold fluid passage when the second diaphragm is closed; and a second pressure responsive check valve structure in the other of said conduits allowing flow from the cold fluid passage to the hot fluid passage when the first diaphragm is closed.

5. A mixing valve comprising a housing formed with a mixing chamber; separate hot and cold fluid inlet passages leading to said mixing chamber; a separate shut-off structure controlling the flow of fluid into each inlet passage; valve means and thermostatic power means operatively connected therewith in said mixing chamber for alternately opening said chamber to respective ones of the hot and cold fluid passages so as to obtain a substantially constant mixing chamber temperature when both inlet passages are supplied with fluid; conduit means interconnecting the inlet fluid passages upstream from the mixing chamber; resiliently urged check valve mechanism in said conduit means including two check valve elements, one of said elements being resiliently urged to close against flow from the hot passage into the cold passage and the other of said elements being resiliently urged to close against flow from the cold passage into the hot passage.

6. The combination of claim 5 wherein the conduit means takes the form of two separate flow ducts, each individually extending between the inlet fluid passages; said one check valve element being located in one duct, and said other check valve element being located in the other duct.

7. A mixing valve comprising a housing defining a mixing chamber and separate inlet passages for supplying hot and cold temperature fluids to said mixing chamber; a separate shut-off structure controlling the flow of fluid into each inlet passage; valve means and thermostatic power means operatively connected therewith for metering the relative amounts of the different temperature fluids into the mixing chamber so as to obtain a substantially constant mixing chamber temperature when both inlet passages are supplied with fluid; conduit means interconnecting the two inlet passages upstream from the mixing chamber; a first check valve means to permit flow of fluid under fluid pressure from the cold to the hot passages when the shut-off structure in the hot inlet passage is closed, a second check valve means to permit flow of fluid under fluid pressure from the hot to the cold passages when the shut-off structure in the cold inlet passage is closed.

8. A mixing valve comprising adjacently positioned housing members defining cold and hot water inlet passages, selectively operable fluid pressure actuated valves controlling the flow of cold and hot water through said inlet passages, a mixing chamber communicating with said hot and cold water inlet passages, valve means in the mixing chamber controlling the flow of water into the mixing chamber from the cold and hot water inlet passages, temperature responsive means positioned in the mixing chamber to control the position of the valve means in accordance with the temperature in the mixing chamber, a conduit connecting the cold water inlet passage with the hot water inlet passage anterior to the valve means, a first check valve in said conduit to permit flow of cold water from the cold water inlet passage to the hot water inlet passage when cold water is flowing through the cold water inlet passage and the flow of water through the hot water inlet passage is interrupted, a conduit interconnecting the hot water inlet passage with the cold water inlet passage anterior to the valve means, and a second check valve in said last-named conduit to permit flow of hot water from the hot water inlet passage to the cold water inlet passage when hot water is flowing through the hot water inlet passage and the flow of water through the cold water inlet passage is interrupted.

References Cited in the file of this patent

UNITED STATES PATENTS

| | | |
|---|---|---|
| 2,269,259 | Fields | Jan. 6, 1942 |
| 2,565,290 | Zak | Aug. 21, 1951 |